United States Patent [19]
Thomas

[11] 3,768,177
[45] Oct. 30, 1973

[54] EDUCATIONAL DEVICE

[76] Inventor: Richard A. Thomas, 4909 Sydclay Dr., Richmond, Va. 23231

[22] Filed: Aug. 2, 1972

[21] Appl. No.: 277,149

[52] U.S. Cl. .................................................. 35/27
[51] Int. Cl. .......................................... G09b 19/00
[58] Field of Search ........................... 35/26, 27, 28; 273/146

[56] References Cited
UNITED STATES PATENTS

| | | | |
|---|---|---|---|
| 2,881,546 | 4/1959 | Gauthier | 35/26 UX |
| 2,995,835 | 8/1961 | Friedman | 35/26 |
| 3,384,982 | 5/1968 | Herbert | 35/26 |
| 3,419,971 | 1/1969 | Ribken | 35/26 |

*Primary Examiner*—Harland S. Skogquist
*Attorney*—Thomas B. Van Poole et al.

[57] ABSTRACT

A multiple sheet composite amusement and educational instruction kit for both children and adults. One facet of the kit teaches and enable picture composition while another facet thereof serves to preliminarily educate a child or student in the basic numbers and letters of the alphabet. The subject composite kit provides amusement and education including both original sketching or doodling upon certain components of the kit, as well as cutting out and/or detaching component unit members and sticking them onto background boards or sheets to compose either artistic composite pictures or to learn the alphabet or numeral sequences.

15 Claims, 9 Drawing Figures

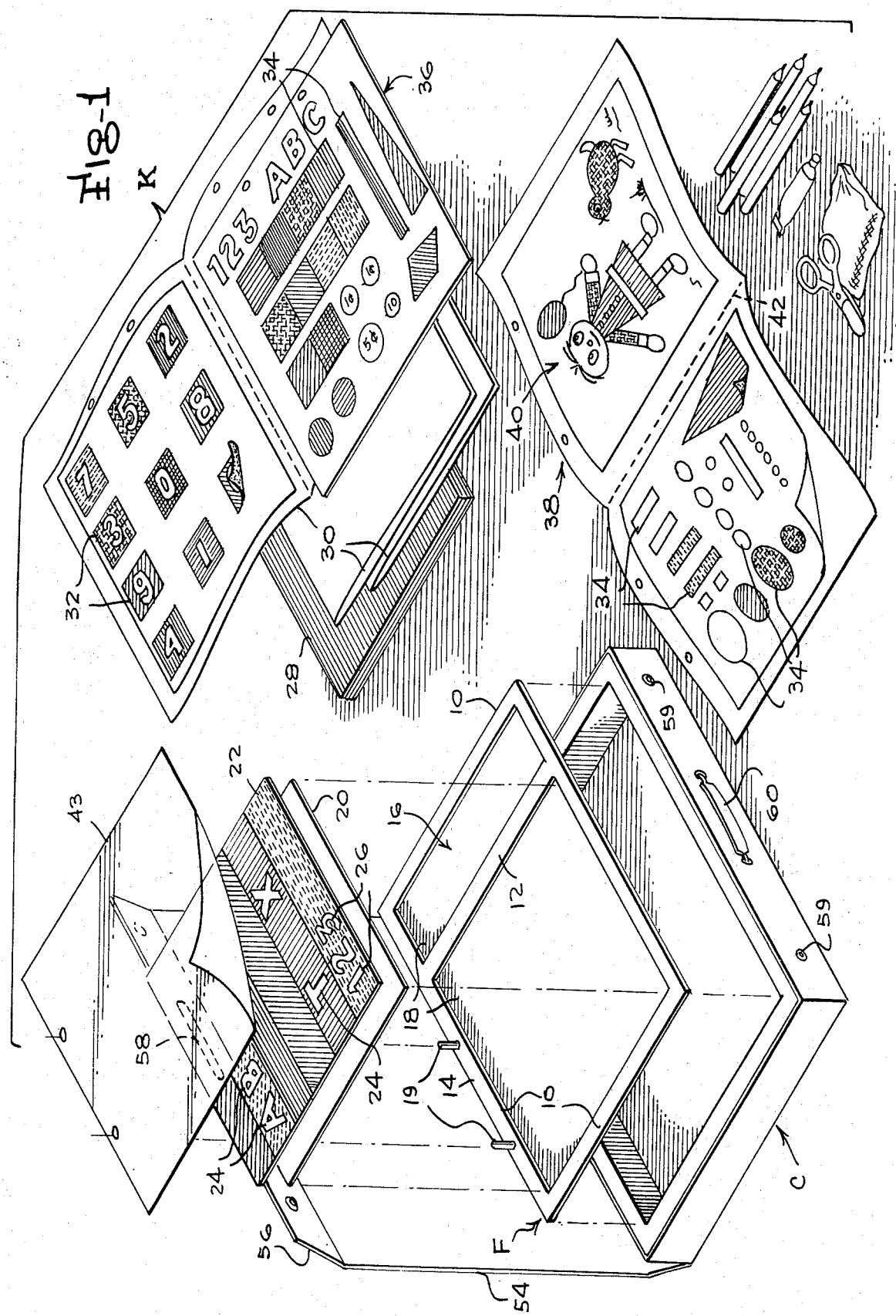

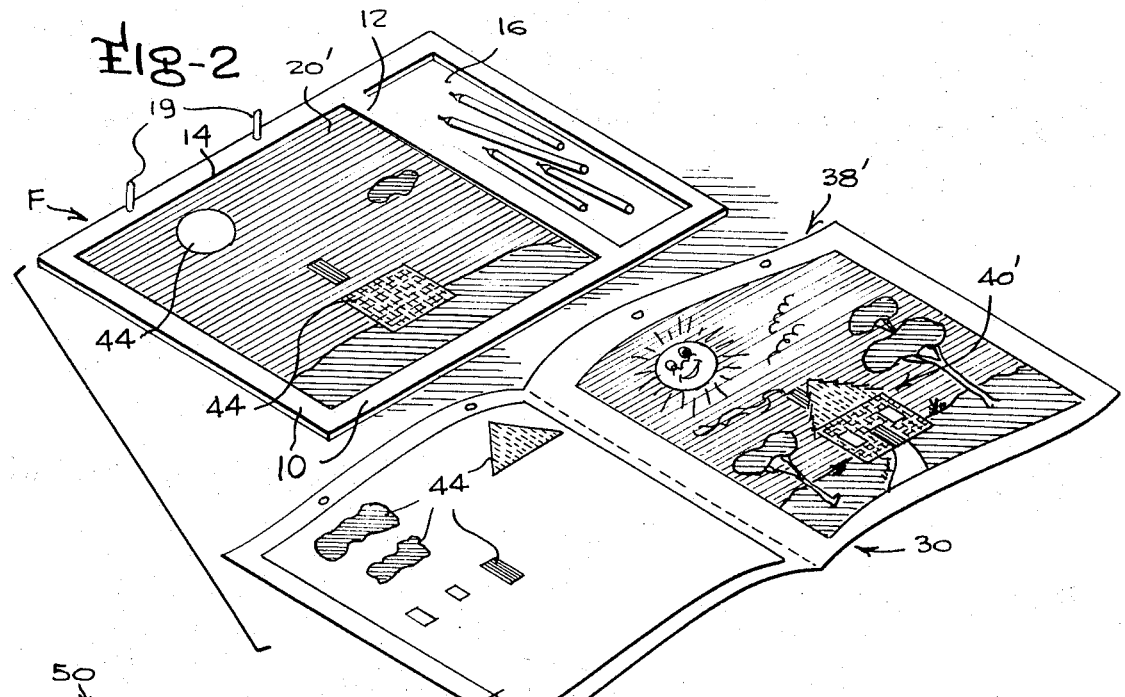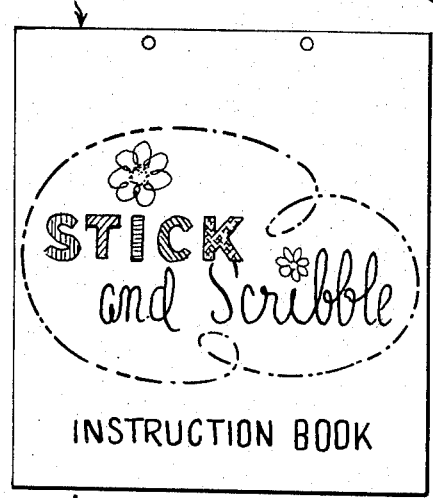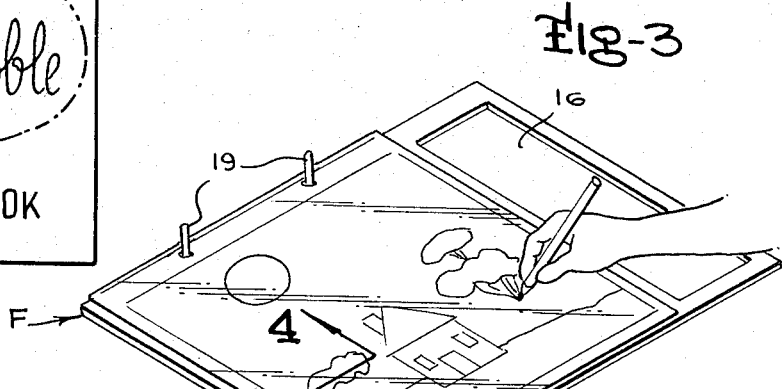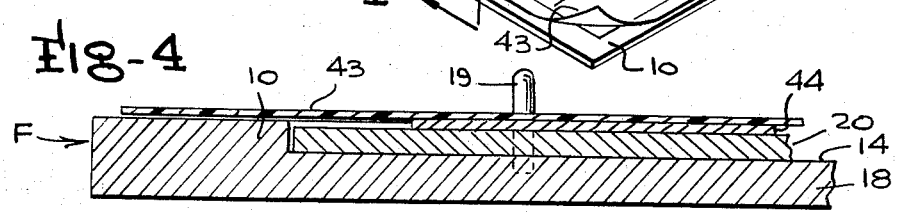

| YOU FIRST HAVE | YOU EARN (+) | YOU NOW HAVE |
|---|---|---|
| 1 | 5¢  1¢ | ¢ |
| 2 | 1¢  5¢  10¢ | ¢ |
| YOU FIRST HAVE | YOU SPEND (−) | YOU NOW HAVE |
|---|---|---|
| 3 | 1¢  1¢ | ¢ |
| 4 | | ¢ |
| 5 | | ¢ |
Fig-5
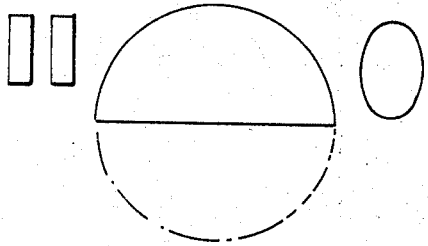
Fig-6a
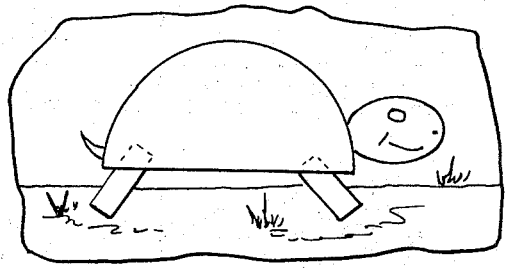
Fig-6b

TO THE PARENT

STICK AND SCRIBBLE is a three in one toy. Not only does it have unlimited educational value, but it also gives your child an opportunity to exercise his creative talents and expand his objective reasoning, at the same time providing him with endless hours of fun.

TAKE A FEW MINUTES----STUDY THE INSTRUCTIONS AND ILLUSTRATIONS IN THIS BOOKLET. HELP YOUR CHILD MASTER THE STICK AND SCRIBBLE TECHNIQUE.

*NOT A ONE TIME TOY Properly used, cleaned, and stored STICK AND SCRIBBLE may be used time and time again.

*NOT A ONE TRACK TOY At your dealer you will find STICK AND SCRIBBLE project kits to fill your child's every need--------

LEARNING TO DRAW     LEARNING YOUR ALPHABET AND NUMBERS     ELEMENTARY MATH

1.
Frame

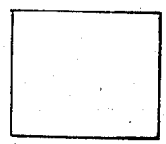
2.
Background Board

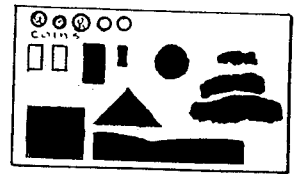
3.
Cutouts

4.
Scribble Flap
(Clear Plastic)

INSTRUCTIONS

IMPORTANT: DRAW ONLY ON SCRIBBLE FLAP (#4)

A) Place Background Board (#2) in Frame (#1)

B) Study illustration on opposite page. Stick Cutouts (#3) on Background Board using illustration as a guide.

C) Place Scribble Flap (#4) in position using pegs at top of Frame.

D) Using Scribble Pencils, scribble in details (walkway, smoke, curtains, flowers, Etc)

TO CLEAN AND STORE: Wipe off Scribble Flap with rag - Return Cutouts to waxed paper - Store in cool dry place Don't insist on, or expect your child to copy the illustration tooclosely - let him use his imagination.

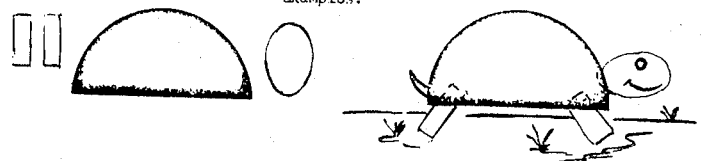

MAKE YOUR OWN CUTOUTS
Cutout Sheets and Sissors are provided. Use your imagination.
Examples:

Fig-7b

EDUCATIONAL DEVICE

This invention relates to a multiple sheet composite amusement and educational or instruction kit preferably for children. One facet of the kit relates to the art of picture composition while another facet thereof relates to the preliminary educating of a child relative to the basic numbers and letters of the alphabet. More particularly, the invention relates to a composite kit to provide amusement and education for children, as well as adults, which provides further for both original sketching or doodling upon certain components of the kit, as well as cutting out and/or detaching component unit members and sticking them onto background boards or sheets to compose either artistic composite pictures or while learning the alphabet or numeral sequences.

The prior art is replete with various forms of pictorial art and related instruction kits in which it is well known to provide pictures of objects which serve as models for duplication by the persons learning to compose, draw or write and to otherwise be amused. Such prior art devices have included a sheet having outlined detachable objects thereon and another sheet on which some of the objects are printed and which may be in various color combinations whereby a child employs the latter as a pattern for coloring the sheet upon which the outlined objects are arranged as by means of color pencils, crayons or paints. Other devices relate to outlined components or unit parts for comprising various parts making up the end result picture patterned after a master print, or which outlined components may be identified by numerals and which are then painted in or alternately covered by colored cut-outs from a secondary sheet provided with the kit.

All of the foregoing prior art devices are helpful and benefical from an amusement and partial educational standpoint of view, but often leave much to be desired, resulting in pictures which are far inferior to the printed patterns from which the user copies, or otherwise places an undue burden on the novice learner which may result in discouragement to him and/or in otherwise unduly distorted end results.

SUMMARY OF THE INVENTION

Accordingly, it is the principal object of this invention to provide an improved composite educational and amusement kit which leads itself to use by the novice learner as well as by more advanced students to provide a highly attentive and amusement producing instrumentality which trains the child to produce finished pictorial representations or to learn numeral and letter sequences which will satisfy his inherent desires to create and learn. Another object is to provide a multiple sheet kit with a plurality of component elements or units which may be used in various manners to produce finished pictorial objects or geometrical figures and scenes and the like in various colors, and which kit requires a certain amount of skill in both cutting out of the colored sheets employed with the kit as well as proper arrangement of these cut-out elements while composing any original work of art.

It is still another object to provide a kit which contains plurality of selected individual units or sub-unit components each depicting fragmentary or, in some instances, complete portions of picture making components, or in other instances letters and numeral elements, each of which may depict an individual subject of art or letter of the alphabet or one of the numerals ranging from zero to nine, and which may be selectively arranged by the user in a manner which is entirely original with him as the composer, or in the alternative, to follow preformed patterns or sequence of pictures or numbers.

Still another object is to induce original practice and creativity by beginners or children in the art of creating picture compositions. Another object is to provide an educational practice especially suitable to young children for learning numbers and alphabetical arrangement of letters preliminary to learning to read and write.

Still another object is to provide a composite kit of the foregoing character in which is provided a mounting frame on which either or both a background board on which at least part of the picture composition or numeral arrangement is to be composed, as well as an overlay scribble flap of clear plastic material or the like, by which additional drawing details may be applied by pencil, crayon or painting and subsequently erased when no longer desired while experimenting with this kit. A still further object is to provide a plurality of color work sheets from which original cut-out parts may be incised either after first originally hand drawing them or by cutting them out free hand according to original, artistic instinct.

The forgoing and other objects of the invention are achieved by the provision of the kit of the foregoing character which in a preferred embodiment comprises a rigid master frame preferably of elongated, rectangular form having a large working area which is preferably recessed below the surface thereof, and a secondary recess area for storage of pencils, crayons, scissors and the like. One or both of the recess areas may be used as a chalk board upon which original scribbling and number writing and the like can be effected. Preferably above the larger of the recess areas are a pair of laterally spaced pegs projecting slightly above the frame and onto which various sheets usable in conjunction with the kit may be retentively and removably applied by means of complementary spaced apertures in said sheets. Among the various sheets which are provided with this multiple sheet kit are preferably solid color background boards or sheets upon which original compositions may be composed; another plurality of sheets containing preprinted and precolored cut-out elements at least some of which preferably have self-adhesive backings and may comprise either complete or fragmentary portions of picture making units; other sheets of various colored paper from which originally designed cut-outs may be made; and additional so-called scribble or doodling flaps or sheets of clear plastic like material to overlay any of the aforementioned background or other composed works of art sheets so as to provide for hand-sketching additional drawing details thereon as may be desired. It is understood that the scribble flap sheets and the chalk board areas may be easily erased by the usual means of a cloth or composition eraser.

The foregoing and other objects and advantages will become more apparent to those skilled in the art by reference to the following detailed description taken in conjunction with the illustrative drawing figures.

BRIEF DESCRIPTION OF DRAWING FIGURES

FIG. 1 is an exploded perspective of the educational amusement device in kit form comprising the subject invention;

FIG. 2 is a perspective view showing the basic frame having recessed work support and storage areas, a pair of spaced mounting pegs on one margin; and also showing a folder type pamphlet of which one page thereof has the cut-out members removably mounted on a sheet of waxed paper or the like, and the other denotes an exemplary finished composition of art;

FIG. 3 shows the frame in use whereby a pictorial composition has been partially prepared as by paste-on segments mounted upon a work sheet beneath an overlaying flexible tracing sheet to which additional pictorial illustrations may be appended as desired by the user;

FIG. 4 is an enlarged fragmentary cross-sectional view of the frame and picture elements as shown substantially by the line 4—4 of FIG. 3;

FIG. 5 is an illustrative sheet showing basic pictorial or graphic arithmetical problems of addition and subtraction;

FIG. 6a depicts an example of some cut-outs which a person may make and using his own imagination, assemble them and supplementally add additional lines thereto in the manner shown in FIG. 6b;

FIGS. 7a and 7b represent respectively the front and back faces of a cover sheet for the instruction and kit booklet whereby FIG. 7b depicts the detailed instructions for using the kit.

DETAILED DESCRIPTION OF THE PREFERRED EMBODIMENT

Like reference characters will be used to denote like parts throughout the several figures of the drawings. Referring more particularly to FIG. 1, the kit is designated generally as K and comprises a carrying and storage case designated broadly in C into which the main frame F can be readily inserted and having superposed thereon a plurality of various backing and assorted colored sheets and including some cut-out and overlay members to be described in more detail hereinafter.

Frame F comprises a rectangular rigid panel or sheet having rigid marginal edges 10 and an intermediate frame strip 12 dividing the basic frame F to a larger pocketed area 14 and a smaller pocketed area 16 and which frame is provided with a suitable bottom or support sheet 18 extending beneath both pocket areas. The depth of the larger recess 14 is preferably sufficient to accommodate one or two fairly rigid backing boards or sheets designated 20, which boards may be used to mount the various cut-outs while composing a pictorial representation of a suitable work of art, or while formulating letter and numerical representations and sequences as desired by the user of the kit. The other recess 16 is preferably used to store pencils, crayons, brushes as well as the scissors, eraser and individual tube of paste if desired, when the kit is not in use.

Another form of backing board or working sheet designated 22 may be provided in which the overall sheets 22 (FIG. 1) is divided into a plurality of horizontally disposed colored strip areas and to which may be applied various letters of the alphabet as denoted at 24, or some of the numerals designated at 26. It is understood that the numerals and letters as applied to the various colored strips preferably will be selected from sheet of differing color than that of the strip upon which they are applied so as to visually contrast therewith. Additionally, there are provided a plurality of blank different colored sheet often known as construction paper and preferably having adhesive backings and from which various original cut-outs may be made and used in the composing of various pictures.

The kit further comprises preferably in the form of a folded jacket or pamphlet 30 additional sheets having thereon various preprinted cut-out geometrical or numerical letter figures designated 32 and 34 respectively. It is understood that individual sheets, rather than the dual or folder type sheets, may be provided with similar type of cut-outs or numerals thereon. It is also understood that an infinite variety of the various geometrical configurations and other modifications thereof may be made to vary the degree of sophistication of various kits that may be evolved from this basic concept.

A preferred manner of mounting the detachable predesigned cut-outs such as shown on individual sheet 36 (FIG. 1) is to provide the backing surface of the cut-outs with an adhesive or sticky wax-like substance and to make the sheet 36 of a wax paper like texture so that the cut-out members are easily removed therefrom but will be readily retained thereon when the kit is not in use.

Still another modified type of folder sheet is shown at 38 (FIG. 1) having on one of the sheets an already prepared pictorial design representative of an artistic composition which a beginner youngster may pattern his work after, as shown at 40. The sheets may be separated from one another by a dotted score line 42 if desired.

Referring next to FIG. 2, the second folder 38' is provided on one sheet thereof with the modified exemplary design 40', and on the opposite sheet a variety of cut-out units 44 detachably maintained preferably on the wax-like backing sheet 45 comprising part of the folder, said units 44 being used to facilitate preparing a similar artistic composition upon design backing board 20' shown inserted into the recess 14 of frame F. It will be observed that some of the cut-outs have already been applied onto the backing sheet with others remaining to be transferred thereto.

FIG. 3 depicts a further sequence or step in the composing of the artistic composition in that the plastic overly sheet 43, having spaced perforations corresponding to those of the frame pegs 19 has been positioned upon said pegs 19, and the student is in the process of drawing on connecting limbs and branches of trees, and the like, for which no cut-outs have been provided. Accordingly, the child is taught not only to use the cut-outs and apply them in either an original or predetermined copy pattern, but also is taught to use his own ingenuity in sketching elements which have not been provided either in preformed cut-out manner or for which he chooses not to make his own cut-outs. The enlarged cross-sectional detail of FIG. 4 shows a clear relationship between the frame F and bottom support sheet 18, pocket 14 into which backing sheet 20 is recessed, and upon which sheet the various cut-out pieces 44 are preferably adhesively attached, and with the overlay sheet 43, being mounted upon pegs 19 to provide the final surface upon which a hand-drawn completion of the composition may be effected. It is understood that overlay sheet 43 is an optional item and not mandatory in the use of the kit facilities, although it may also serve as a protective cover to the finished composition.

FIG. 5 is representative of a further sheet 46 upon which a variety of simple arithemetical problems of addition and/or subtraction may be set up to teach the child or beginner student. It is seen that the sheet is divided into three vertical columns 47, 48, 49. Column 47 is headed "You first have;" column 48 is headed "You earn (+)"; and column 49 is entitled "You now have." FIG. 5 also shows that in the first horizontal row of the problem in column 47 there have been depicted a series of coins represented by a nickel, penny and dime which the student is taught to total mentally or separately on a scratch sheet of paper. In the same horizontal row under column 48 there are places outlined for the marking or the attachment of certain representations of cut-out coins of the student's choice perhaps representing money that he has earned, and the values of which are to be added to the previous total of column 47, with the new total to be deposited either by writing the numerals on the line provided in column 49 or by using cut-out and stick on numbers. The second horizontal row is a similar problem but merely showing different coin values in column 47 and having a plurality of three coins to be added in column 48. The third row depicts a further problem which this time is set up for subtraction in which column 48 is titled "You spend (−)". The student then is again reminded to total the figures represented by the exemplary coins in the column 47, and then taught that if he spends or loses one or two coins that he must subtract or take them away from the total he had to begin with, resulting in a lower rather than higher figure to be entered in column 49. It is understood that in the more highly sophisticated kits used for students of advanced standing, other work sheets bearing mathematical problems in multiplication and division and even square root may be embodied if it is desired to carry the concept to this extent.

FIGS. 6a and 6b are believed to be self-explanatory in view of the figure description at the beginning of the specification.

FIGS. 7a and 7b represent the front and back of a combined illustrative cover sheet and instruction sheet 50, respectively. The cover sheet face represented in FIG. 7a shows a fanciful representation and title of the kit such as "STICK and Scribble." The letters forming the word "STICK" are depicted in cut-out block letters of various colors, whereas the working "and Scribble" are depicted in a scribbled or scrawled type of lettering, representing that the student can write certain things in by hand rather than by use of preformed cut out members. The face represented in FIG. 7b is merely representative of the instructions setting forth basic objectives and components comprising the kit as well as the detailed sequential steps for use of the kit, together with illustrative examples in miniaturized form. The said combined sheet 50 is also complementarily apertured in the upper edge so as to fit upon pegs 19, just as are the various pamphlet and individual sheet forms comprising various of the kit components.

It is believed that the use and operation of the kit components has been sufficiently described hereinbefore and need not be repeated; however, in addition to being able to scribble upon the plastic flexible overly sheet 43, the student or child may also scribble as with chalk on a blackboard surface 52 provided at least on recessed area 14.

The kit is preferably provided with a plurality of backboards 20 so that the student composer may preserve, if desired, at least temporarily his composition particularly where it is partially composed of cut outs and is completed as by crayon or pencil indicia as desired to embellish the composition, being appended to the back board rather than upon the plastic overlay sheet from which such markings can be readily erased. Alternatively, the backboards may have a semi-waxy or similar surface from which such applied crayon and pensil indicia maybe more easily removed. Of course, a plurality of overlay sheets 43 may be provided by that if the pencil or crayon indicia is applied to the plastic overlay, it may be temporarily maintained in association with the backboard and superposed cut outs. Also, additional of the clear plastic sheets may be used to protect and view the composition without having any indicia applied thereto.

The carrying case C is provided with a suitable bottom and four side walls, as well as with a hingedly connected large area top wall 54. Top wall 54 is large enough to facilitate easy ingress and egress of all kit components, and is provided further with a fold-over flap 56 which preferably overlap the front side edge opposite the rearwardly hinged side. Fold-over flap 56 is further preferably apertured at 58 in a medial portion thereof through which the loop of preferably a strap-type carrying handle 60 is inserted so as to effect a suitable closure retaining and handle means during carrying of the kit. It is to be understood that various other snaps 59 or flip-type catches for retaining the cover closure in place may be used, if desired, either supplementally or in lieu of the aforedescribed means.

It is understood that the foregoing description has been for the illustrative purpose of exemplifying various ways in which the novel kit can be utilized. It is apparent that the various units and/or materials comprising the kit are relatively inexpensive and simple to use, and the variety and number of components are their respective degrees of sophistication and complexity may be varied in additional kits for students or users of advanced fine art training and ingenuity.

Accordingly, a novel creative artistic and educational teaching aid kit has been invented which achieves all of the objectives and advantages set forth in the preamble and throughout the specification. Further variations and modifications may be made to those skilled in the art without departing from the overall concepts, and reference is made to the appended claims for a definition of the scope of the invention.

I claim:

1. A multiple sheet creative amusement and educational teaching aid kit for composing a variety of composite artistic scenes and for teaching numerical and letter sequences and other like arrangements, and kit comprising in combination:
   a. a frame member having rigid marginal edges and a planar support surface recessed a predetermined distance below said marginal edges for receiving therein at least one of a plurality of said multiple sheets comprising the kit;
   b. at least one of said multiple sheets being a relatively rigid, planar backing sheet or board member of a size to removably fit within and upon said frame recessed support surface;

c. at least another of said sheets having a variety of different colored, pre-shaped cut out members, some of which constitute picture-making units and sub-units, which are detachably fastened therewith and transferable therefrom for selective attachment upon said backing and other sheet members in either an original or a predetermined copy arrangement, to thereby constitute a substantial part of a pictorial composition as determined by the individual composer;

d. a plurality of other units and sub-units constituted by different basic number and alphabetical letter units which are detachably mounted in association with at least a part of one of said multiple sheets of the kit; said units and sub-units also being transferable therefrom for selective attachment to another of said multiple sheets in original or predeterminable copy sequence as determined by the individual composer for formulating letter and number sequences and mathematical problem-formulating sequences; and e. at least one flexible transparent overlay sheet of a size corresponding generally to that of said backing sheet; said overlay sheet having a surface characterized by the ability to removably record an impression imposed thereon by a rigid working member, thereby facilitating the application of selective auxiliary or supplemental indicia and markings to help complete a composite artistic composition as desired by said composer, and said overlay sheet otherwise serving the function of a protective cover.

2. A kit as defined in claim 1, further including a plurality of different color, flexible, and readily incisable sheet members from which both pictorial and letter and numeral graphic representations may be cut of original or copied design form.

3. A kit as defined in claim 1, further including a plurality of different color marking members for applying indicia; scissors for cutting out picture, number and letter making units; and eraser means for removing applied indicia.

4. A kit as defined in claim 3, wherein said frame member includes means defining an auxiliary recessed pocket area of lesser area than and apart from said recessed planar support surface, said auxiliary recessed area adapted to house said marking members, scissors and eraser means.

5. A kit as defined in claim 1 wherein said frame member is provided with a pair of spaced-apart peg members projecting upwardly from the major plane of the frame member, upon which at least certain of said multiple sheets including said flexible transparent overlay sheet, have spaced marginal apertures correspondingly sized and spaced to said peg members and applicable therewith to orient and removably retain same in superposed relation to the frame and underlying board or sheet members.

6. A kit as defined in claim 5, wherein one of said multiple sheets includes a combined title and instruction sheet, having apertures corresponding to said peg members for selective mounting thereon; and said sheet having one face upon which individual preformed letter unit representations are placed to spell out at least part of the title wording, thereby graphically depicting one particular potential application or use of a portion of the kit's components; and wherein another part of said title is depicted in a form of handwriting, thereby graphically illustrating a second different potential characteristic and use afforded by the kit and its components by handdrawn representations of supplemental artistic and like indicia to embellish and help complete compositions and sequences.

7. A kit as defined in claim 6, wherein said combined title and instruction sheet has a reverse face or page devoted essentially to instruction used indicia, including miniature graphic representations of certain of the kit components and a sample representative creative use thereof.

8. A kit as defined in claim 1 wherein at least one of said multiple sheets has indicia representing a partial mathematical problem depicted thereon in a predetermined manner relative to one margin thereof; and additional adjacently disposed indicia outlined to correspond with and to be covered by placement thereon of certain other predetermined picture and number sequence making units to visually and graphically represent a further part of said mathematical problem in relation to said first-mentioned indicia and margin, and still further indicia in predetermined adjacent relation to said firstmentioned and said second-mentioned additional indicia, upon which number units are applicable to designate the answer to said mathematical problem.

9. A kit as defined in claim 5 wherein at least one of said multiple sheets is provided with correspondingly spaced apertures to mount said sheet on said pegs, and said sheet being provided with indicia representing a partial mathematical problem depicted thereon in a predetermined manner relative to one margin thereof; and additional adjacently disposed indicia outlined to correspond with and to be covered by placement thereon of certain other predetermined picture and number sequence units to visually and graphically represent a further part of said mathematical problem in relation to said first-mentioned indicia and margin, and still further indicia in predetermined adjacent relation to said first-mentioned and said second-mentioned additional indicia, upon which number units are applicable to designate the answer to said mathematical problem.

10. A kit as defined in claim 1 wherein two of said multiple sheets are joined together along corresponding side edges to form a folder whereby said respective sheets provide adjacently disposed pages, one of which is of the type defined in paragraph (c) and the other of which includes indicia at least part of which is representative of an exemplary composition by which the composer can be guided in arranging said units and sub-units.

11. A kit as defined in claim 1 wherein two of said multiple sheets are jointed together along corresponding side edges to form a folder whereby said respective sheets provide adjacently disposed pages, one of which is of the type defined in paragraph (d) and the other of which includes indicia at least part of which is representative of an exemplary composition by which the composer can be guided in arranging said units and sub-units.

12. A kit as defined in claim 5 wherein two of said multiple sheets are jointed together along corresponding side edges to form a folder whereby said respective sheets provide adjacently disposed pages, one of which is of the type defined in paragraph (c) and the other of which includes indicia at least part of which is representative of an exemplary composition by which the composer can be guided in arranging said units and sub-units.

13. A kit as defined in claim 1, further including a carrying case having wall means defining bottom, side and top cover portions of said case; and carrying handle and closure-retaining means attached thereto.

14. A kit as defined in claim 13, wherein said top cover wall portion has major length and width dimensions in excess of the corresponding overall size of said frame members, includes means forming a flexible hinge connection along one edge thereof to completely open said carrying case to facilitate easy ingress and egress of all kit components.

15. A kit as defined in claim 14, wherein said carrying handle and closure-retaining means include a carrying handle projecting transversely from a side edge of said carrying case, said top wall portion further having a fold-over flap adapted to overlay said side edge from which said carrying handle projects, and said fold-over flap being apertured to complementally receive therethrough said carrying handle to effect a closure retaining relationship of said top cover to said carrying case.

* * * * *